Jan. 8, 1935.  J. L. VAN DISSEN ET AL  1,986,989
ELECTRIC WATER PURIFIER
Filed Sept. 15, 1931  2 Sheets-Sheet 1
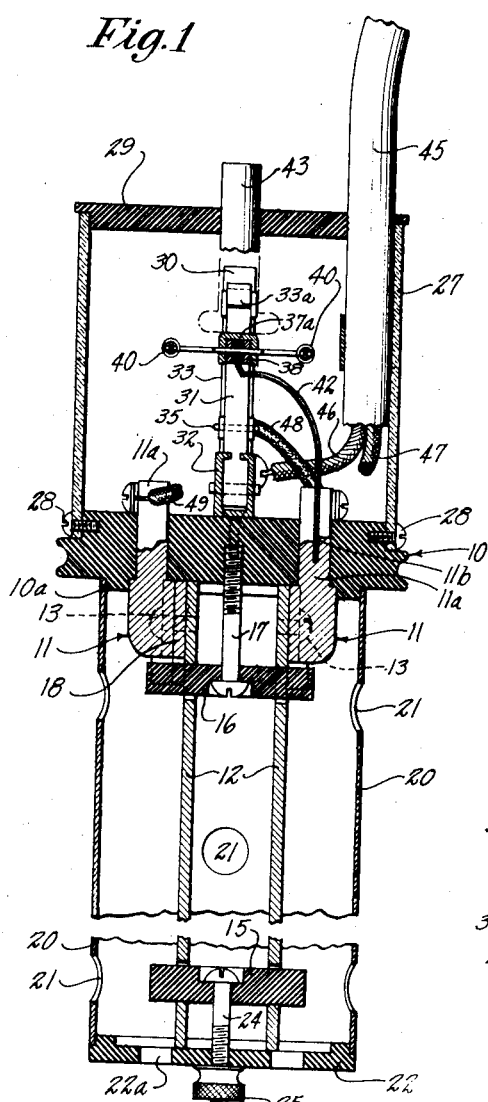
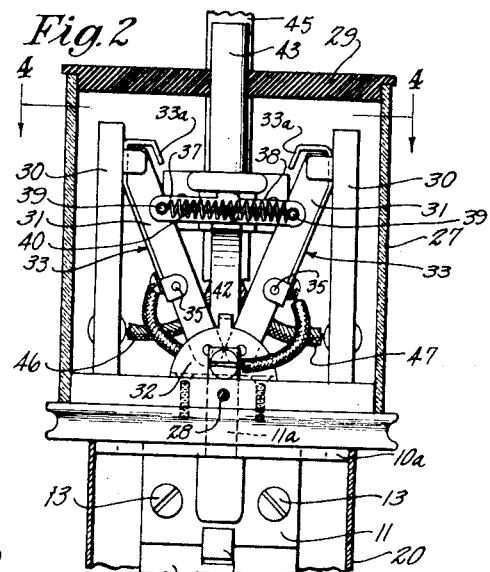
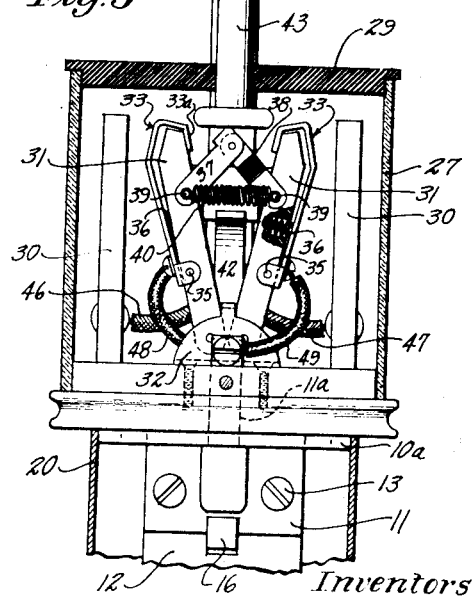
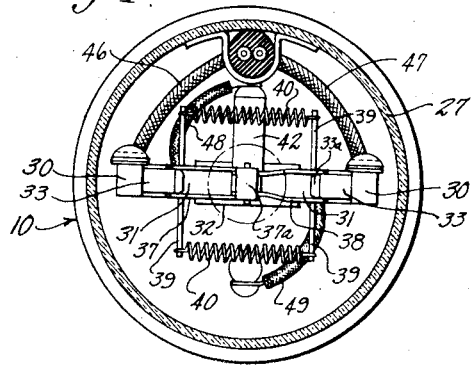
Inventors
James L. Van Dissen,
Theodore O. Williams,
Jess Max Lee.
Attorney.

Jan. 8, 1935. J. L. VAN DISSEN ET AL 1,986,989
ELECTRIC WATER PURIFIER
Filed Sept. 15, 1931  2 Sheets-Sheet 2
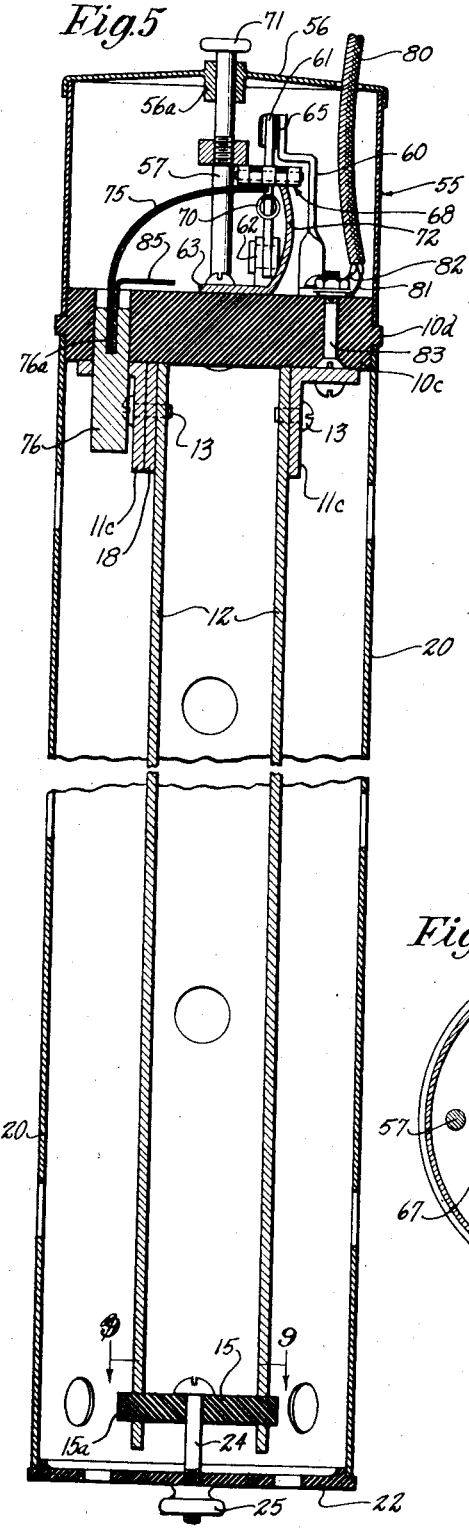
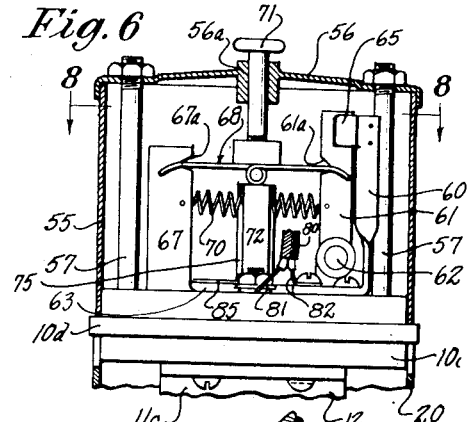
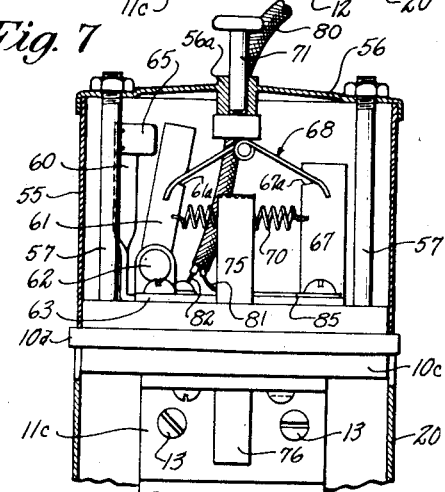
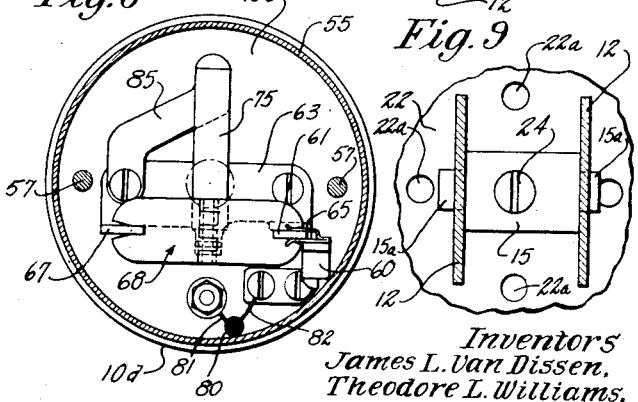
Inventors
James L. Van Dissen,
Theodore L. Williams,
Jess Max Lee.
Attorney.

UNITED STATES PATENT OFFICE 1,986,989

ELECTRIC WATER PURIFIER

James L. Van Dissen, Theodore O. Williams, and Jess Max Lee, Los Angeles, Calif.; said Williams and said Lee assignors to said Van Dissen Application September 15, 1931, Serial No. 562,920

1 Claim. (Cl. 200—138)

This invention has to do with water treaters, and more especially with that class of treaters of which typical examples are the electrolytic purifiers in which an electric current is passed between two seats of immersed electrodes. These purifiers are generally for the purpose of removing organic and inorganic impurities, both dissolved and suspended, by means of electrolytic treatment. The water is decomposed into its elements by the passage of the electric current between the two sets of electrodes, and the oxygen and hydrogen react with the impurities to render the water potable. While electrolysis is obtained with electrodes of any material, it is often desirable to use aluminum, as is well known in the art, but it will be appreciated that the use of any particular material is not necessary in our invention. The value of aluminum electrodes is that a flocculent precipitate of aluminum hydroxide is formed that aids in removing solid matter.

It is a general object of our invention to provide a simple, compact device, having the electrodes so mounted as to permit adjustment of the spacing between them and having the electrodes covered yet readily accessible for purposes of cleaning and inspection. By covering the electrodes, they are protected against injury and short circuiting, and the user is protected against accidental contact with current carrying elements.

Another object of the present invention is to provide a thermally actuated switch that will quickly and positively shut off the current after the water has been treated for a suitable length of time. The switch actuating means is responsive to the rise in temperature of the water, and, a large amount of water requiring longer to heat for a given rate of current consumption, operates to vary the length of treatment time in proportion to the quantity of water treated.

These objects are accomplished by the provision of spaced electrode mounting brackets from which the electrodes may be adjustably spaced to change the inter-electrode distance. The protecting casing is suitably formed to surround the electrode and yet allow free water circulation. A base plate detachably secured to an electrode spreader holds the cover in place and yet permits easy removal of the cover.

The switch is of the type characterized by a fixed contact and a movable contact and a spring means to positively separate the contacts when the contact maintaining means is released. Such holding means is released by movement of a thermal element, which latter has a mounting that is preferably in direct contact with the water, but is also mounted as to receive heat conducted thereto by one of the electrodes so that direct water contact of the mounting, though preferable, is not necessary. The switch quickly and positively separates the contacts to prevent arcing and burning at the contact points, and so contributes to the reliability and long life of the switch and treater.

Although we show and describe the novel type of switch in conjunction with a water purifier, it is to be understood that it may be used with other types of treaters in which the liquid becomes heated. As an example, immersion heaters are made which are generally similar to our purifier except that a heating element is substituted for the electrodes, and in such cases the construction and operation of the switch might be unaltered.

The manner of accomplishing these and other objects and the advantages of our invention will be better understood by reference to the drawings and the following description wherein we describe two forms of our invention.

In the drawings:—

Fig. 1 is a vertical median section of a water purifier constructed in accord with our invention;

Fig. 2 is an elevation of a switch mechanism in closed position as viewed from the right of Fig. 1, the switch housing being broken away;

Fig. 3 is a view similar to Fig. 2 showing the switch in open position;

Fig. 4 is a plan view of the switch on line 4—4 of Fig. 2;

Fig. 5 is a vertical median section of a variational form of switch and water purifier;

Fig. 6 is an elevation of the switch mechanism in closed position as viewed from the right of Fig. 5, the switch housing being broken away;

Fig. 7 is an elevation of the switch similar to Fig. 6, but as viewed from the left of Fig. 5, showing the switch in open position;

Fig. 8 is a plan view of the switch on line 8—8 of Fig. 6; and

Fig. 9 is a fragmentary plan of the electrode spreader on line 9—9 of Fig. 5, the electrodes being shown in section.

Referring to Fig. 1, wherein is shown a preferred form of our invention, it is seen that the circular insulator head 10, formed of any suitable insulating material, carries on its under face a pair of spaced brackets 11, preferably of aluminum, to which are secured by screws 13 the vertically extending aluminum electrodes 12. These electrodes are preferably in the form of flat bars (Fig. 9), to obtain a suitable amount of surface, and extend parallel to each other. At the lower end the electrodes are held spaced apart by spreader bar 15 of insulating material. As shown in Fig. 9, spreader bar 15 has projections 15a on each end which form shoulders against which the electrodes 12 rest, the projections 15a extending through suitable holes in the electrodes to hold the spreader against displacement.

Brackets 11 have upwardly extending post portions 11a which project through and above insulator head 10 and serve as binding posts as will be later explained. Posts 11a fit tightly within the insulator head to form a water tight joint therewith. The assembly of the electrodes and brackets on the insulator head 10 is completed by attaching spreader 16, which is similar to spreader 15, to the insulator head by means of screw 17 which thus holds all the parts in position.

The spacing between the electrodes determines the resistance in the electric circuit and is preferably adjustable to enable the resistance to be maintained at a more or less constant value, the spacing being increased for water of higher conductivity. The electrodes are mounted on the vertical faces of brackets 11 and the proper adjustment is secured by means of spacers 18 placed between the brackets and the electrodes as shown in Fig. 1. These spacers may be placed under one or both electrodes and are of the same material as the electrodes and brackets. Spreaders 15 and 16 of different sizes are used to fit the different spacings between the electrodes.

The electrodes are protected by being surrounded by tubular casing 20, which at its upper end fits loosely around the annular flange 10a on the bottom of insulator head 10. Casing 20 is held in place by base plate 22, also of insulating material, which fits against the lower end of the casing and is fastened to spreader 15 by bolt 24 with thumb nut 25. By removing nut 25, casing 20 may be easily removed for cleaning and inspection of the electrodes. Circulation of the water through the tubular cover and around the electrodes is permitted by the provision of circulation holes 21 in the casing and holes 22a in the base plate.

In devices of this nature it is desirable that an automatic switch be provided to shut off the current after a suitable length of treatment and to prevent the water from boiling away. Because of the heat generated during the electrolytic treatment of the water, such a switch may conveniently be adapted to operate as a result of rise of the water temperature.

A thermally actuated snap switch is mounted on top of insulator head 10 and is enclosed within cylindric housing 27 which fits tightly around the head and is fastened thereto by means of screws 28. The lid 29 closes the upper end of housing 27. Housing 27 and cover 29 may be made from any suitable substance but preferably from some non-conducting material.

The switch is of the double pole type having as stationary contact elements the vertical posts 30 secured at their bases to insulator head 10 and against which the movable contacts are pressed. The movable contact-carrying arms 31 are pivoted at their lower ends in base plate 32 and are adapted to swing in a vertical plane about their pivot points to carry the contact strips 33 into engagement with stationary contact posts 30. Each contact strip 33 is pivotally attached at one end at 35 to an arm 31 and has a portion that extends along the face of the arm and is then bent at its upper end so that when the switch is closed, as in Fig. 2, the upper portion of the contact strip will be parallel and in contact with post 30. Contact strip 33 is then bent back over the top of arm 31 and has a tip 33a that engages the back side of arm 31 as shown in the position of Fig. 3. The contact strip is normally urged away from its carrying arm by means of spring 36 which is seated in a suitable bore in the arm and tends to keep tip 33a of the contact strip in engagement with the upper portion of the arm.

Swinging arms 31 are operated by means of a toggle comprising members 37 and 38 (Fig. 3) pivoted together at their inner ends and pivoted at their outer ends by pins 39 to the contact carrying arms. Thus, as illustrated in Fig. 2, when the toggle is straightened out to a horizontal position, the arms are spread apart and press contact strips 33 into tight contact with stationary post 30. The circuit is then closed. Toggle member 37 has a bridge portion 37a at the toggle knee which rests against member 38 when the toggle is flattened out and prevents the knee from being depressed below the horizontal position to a position from which it would not operate properly. Pins 39 that join the toggle legs to the contact carrying arms extend beyond the arms and carry between their ends the tension springs 40. Thus when the toggle legs are inclined to one another, as in Fig. 3, springs 40 pull arms 31 together and break the contact between strips 33 and posts 30 to open the circuit.

Because the pressure is endwise on the toggle and has no vertical component, the toggle, once flattened, remains so. Also, it requires but a slight pressure at the toggle knee to cause the two parts to become inclined one to the other. Consequently once the legs of the toggle are so inclined that there is a vertical component of the endwise pull from springs 40, the switch quickly snaps open and the current ceases to flow until the switch is manually reset. It will be plain that as arms 31 first move toward each other from the position of Fig. 2, that springs 36 still maintain contacts 33 in their position against posts 30. However, after a slight movement of arms 31, they come in contact with tips 33a of the contact strips and pull the strips away from the posts. In the interval between the first motion of arms 31 and the time that they engage tips 33a, the arms have gained considerable momentum under the urging of springs 40 and the result is a quick and sudden jerk of the contact strips away from the stationary contacts. This results in a rapid and positive opening of the switch points and reduces burning and arcing of the contacts to a minimum.

Another advantage accrues from the use of springs 36. Even though arm 31 at the limit of its movement toward post 30, were unable to bring strip 33 into contact with the post, spring 35 will push the strip outward and make the contact. This provides an automatic compensation for wear so that the positive closing of the switch is always assured even though there has been some wear at the contact points.

The preferred means for releasing the toggle from the horizontal set position is the bi-metal strip 42 confined at one end and free at the other. The confined end of strip 42 is set in post 11a of one of brackets 11 which is slotted at 11b to receive the strip. The heat from the water is thus conducted through bracket 11 to strip 42, and the heating of the strip tends to raise the free end so that it in turn presses against and raises the toggle knee to release the toggle so that the switch may be opened under the pull exerted by springs 40. It will also be apparent that even though the water level is not as high as brackets 11, that heat will be conducted from the water to the bracket by means of attached electrode 12 and consequently it is not necessary that bracket 11 or the conducting post in which metallic strip 42 is set be in direct contact with the water being treated.

After the switch has once been opened, it can only be closed again by manual operation. To accomplish this, there is provided push-button 43 which slides vertically in cover 29 and bears at its lower end directly on bridge 37a at the toggle knee. Thus when the toggle has been raised, as in position of Fig. 3, it may be returned to the position of Fig. 2 by merely pressing upon the push button until the toggle is again straightened out. The position of push button 43 thus serves as a visual signal as to whether the switch is open or closed.

Electric power is supplied to the purifier through cable 45 which has two leads 46 and 47, one each of which runs to a stationary post 30. When the circuit is closed, the current flows from a post 30 into the associated contact strip 33, from strips 33 through lead wires 48 and 49 to the binding posts 11a of brackets 11, and then directly to the electrodes.

Fig. 5 illustrates in vertical median section a variational form of our invention. In this form the angle brackets 11c carrying electrodes 12 are screwed directly onto the underside of insulator head 10c. One or more spacers 18 may be used as indicated to properly space the electrodes 12, as described above. Casing 20 fits loosely around the bottom of head 10c and against peripheral flange 10d, being held in place by means of base plate 22 attached by bolt 24 to spreader 15 in the same manner as already described.

On top of insulator head 10c is mounted a thermally actuated switch incased within housing 55 which fits around the top of insulator head and rests against peripheral flange 10d, cover 56 being provided to close the upper end of housing 55. Bolts 57, having their heads embedded in the insulator head, extend vertically through the cover 56 and secure the cover and housing in place.

The switch here illustrated is of the knife blade, single pole type and is generally similar to the form already described except that instead of breaking both contacts only one contact is broken. The contact arm 60 is mounted on head 10c and the swinging blade 61 pivoted at 62 to the member 63 attached to head 10c. Blade 61 swings in a vertical plane about pivot 62 to engage contact clip 65 on arm 60 to complete the electric circuit. Member 63 is generally U-shaped with the base portion flat on head 10c and has an upwardly extending post portion 67 spaced from blade 61 to take toggle 68 between the post and the switch blade. The post and blade are notched at 67a and 61a respectively, and the notched end of the toggle fits within these notches so that the toggle may pivot at its end supports.

When toggle 68 is straightened to a horizontal position as in Fig. 6, it reacts against post 67 to force blade 61 into clip 65 and the circuit is closed. If, however, the legs of the toggle become inclined to one another, spring 70 attached between blade 61 and post 67, pulls blade 61 out of clip 65 and raises the knee of the toggle as in Fig. 7. The electric circuit is now open and will not become again closed until the switch is manually closed.

From the foregoing it will be apparent that arm 31 and blade 61 are similar in function and operation, the only real difference being that in the case of arm 31 the contact carried is movable relative to the arm while in the case of blade 61 the contact is fixed. In both cases they may be termed movable contact arms.

As a means for manually resetting the switch, push button 71 having a sliding bearing at 56a in cover 56, is provided. By pressing down on the top of the push-button which bears at its lower end against the knee of the toggle, the toggle may be flattened out and the switch closed. Stop 72 (Fig. 5), part of member 63, limits the downward movement of the toggle so that it may not be depressed past the correct position to hold the switch blade in place.

The means for releasing the toggle from the flattened out horizontal position is the bi-metal strip 75 which presses at its upper free end against the under side of the toggle knee and is confined at its lower end in a heat conducting rod 76. Conducting rod 76, which is slotted at 76a to receive the bi-metal strip, fits tightly in a hole passing through the insulator head and one bracket 11c. The joint between rod 76 and the insulator head is tight so that no water leads into the switch housing; and the joint between the rod and bracket 11c is tight to be thermally and electrically conductive so that heat may be transmitted from the electrode to the rod and electricity from the rod to the electrode. Thus, though preferable, it is not necessary that rod 76 extend below the water level.

The heat is conducted from rod 76 to the bimetal strip, and it has a tendency, when warm, to straighten out. It thus presses against the under side of the toggle, causing it to break and thereby allowing spring 70 to draw blade 61 to the open position of Fig. 7. When the switch snaps open under the action of spring 70, the toggle is held against springing out of place by contact of the upper surface of the toggle arms with the upper inclined surfaces of notches 67a and 61a. As an additional safeguard, push-button 71 may be raised into contact with the bottom of bearing 56a and so limit the upward movement of the toggle knee.

Electricity is supplied to the treater by cable 80 which has two lead wires 81, 82. Lead 81 is connected to a flat headed screw 83, or other suitable means, for transmitting the current to one of brackets 11c and thus carrying the current to the attached electrode. The other lead wire 82 is fastened to the base of stationary contact arm 60 and the current passes through arm 60, clip 65, and arm 61 to member 63. From member 63 the current is lead by means of a flat contact strip 85 to rod 76, the strip 85 being taken in slot 76a of the conducting rod, and to the associated bracket 11c and electrode 12.

Although we have described certain forms of our water treater, it will be understood that the drawings and description are to be considered as illustrative of rather than restrictive upon the claim appended hereto, for it will be apparent that various changes may be made in these forms without departing from the spirit and scope of our invention.

We claim:—

A switch for a liquid treater, comprising an insulating base, a pair of spaced contact posts mounted on the base, a pair of contact arms pivoted to the base, and each movable into contact with one of said posts, a pair of toggle members connected to each other to form a knee and to the pivoted arms to hold the arms apart and in contact with the posts, resilient means attached to each arm to normally draw said arms toward each other, manually operated means pressing down on the toggle knee to spread the arms into contacting position, and thermally actuated means pressing upwardly on the toggle knee to collapse the toggle members and draw the arms out of contacting position.

JAMES L. VAN DISSEN.
THEODORE O. WILLIAMS.
JESS MAX LEE.